US008014624B2

(12) United States Patent
Olschewski

(10) Patent No.: US 8,014,624 B2
(45) Date of Patent: Sep. 6, 2011

(54) METHOD, ARRANGEMENT, AND SOFTWARE FOR OPTIMIZING THE IMAGE QUALITY OF MOVABLE SUBJECTS IMAGED WITH A MICROSCOPE

(75) Inventor: Frank Olschewski, Heidelberg (DE)

(73) Assignee: Leica Microsystems CMS GmbH, Wetzlar (DE)

(*) Notice: Subject to any disclaimer, the term of this patent is extended or adjusted under 35 U.S.C. 154(b) by 884 days.

(21) Appl. No.: 10/632,499

(22) Filed: Aug. 1, 2003

(65) Prior Publication Data

US 2004/0022449 A1 Feb. 5, 2004

(30) Foreign Application Priority Data

Aug. 2, 2002 (DE) .................................. 102 35 657

(51) Int. Cl.
*G06K 9/40* (2006.01)
(52) U.S. Cl. .......................... 382/260; 382/103
(58) Field of Classification Search .................. 382/103, 382/107, 128, 260; 348/169–172, 208.14; 345/181; 359/383; 396/51; 244/3.1, 3.16; 235/411; 250/203.1–203.7
See application file for complete search history.

(56) References Cited

U.S. PATENT DOCUMENTS

| 3,967,054 | A | * | 6/1976 | Walton | 348/141 |
|---|---|---|---|---|---|
| 4,400,719 | A | * | 8/1983 | Powers | 348/450 |
| 4,727,422 | A | * | 2/1988 | Hinman | 375/240.12 |
| 4,851,900 | A | * | 7/1989 | Edwards et al. | 348/33 |
| 5,361,105 | A | * | 11/1994 | Iu | 348/699 |
| 5,502,489 | A | * | 3/1996 | Kim et al. | 348/607 |
| 5,579,444 | A | * | 11/1996 | Dalziel et al. | 700/259 |
| 5,600,731 | A | * | 2/1997 | Sezan et al. | 382/107 |
| 5,611,000 | A | * | 3/1997 | Szeliski et al. | 382/294 |
| 5,682,205 | A | * | 10/1997 | Sezan et al. | 348/452 |
| 6,008,865 | A | * | 12/1999 | Fogel | 348/700 |
| 6,250,928 | B1 | * | 6/2001 | Poggio et al. | 434/185 |
| 6,466,624 | B1 | * | 10/2002 | Fogg | 375/240.27 |
| 7,072,398 | B2 | * | 7/2006 | Ma | 375/240.16 |
| 2001/0052933 | A1 | * | 12/2001 | Nybo et al. | 348/207 |
| 2003/0012408 | A1 | * | 1/2003 | Bouguet et al. | 382/103 |
| 2004/0076999 | A1 | * | 4/2004 | Faeldt et al. | 435/6 |

OTHER PUBLICATIONS

Eng et al., Motion Trajectory Extraction Based on Macroblcok Motion Vectors for Video Indexing, Oct. 24-28, 1999, 1999 International Conference on Image Processing, vol. 3, pp. 284-288.*
Shah et al., Generation and Segmentation of Motion Trajectories, Aug. 30-Sep. 3, 1992, 11th IARP International Conference on Pattern Recognition, vol. I, pp. 74-77.*

* cited by examiner

*Primary Examiner* — Matthew Bella
*Assistant Examiner* — Dennis Rosario
(74) *Attorney, Agent, or Firm* — Houston Eliseeva, LLP

(57) ABSTRACT

A method and an arrangement for optimizing the image quality of movable subjects imaged with a microscope system are proposed. The microscope system encompasses at least one objective that defines an image window. Motions of the subjects being observed are captured in the image frame. A computer system, having a means for determining a respective displacement vector field from a comparison of the respective pixels of two chronologically successive images, generates a trajectory from the synopsis of the displacement vector field of all the acquired images. A means for applying an operation to the image data along a trajectory is also provided.

10 Claims, 6 Drawing Sheets

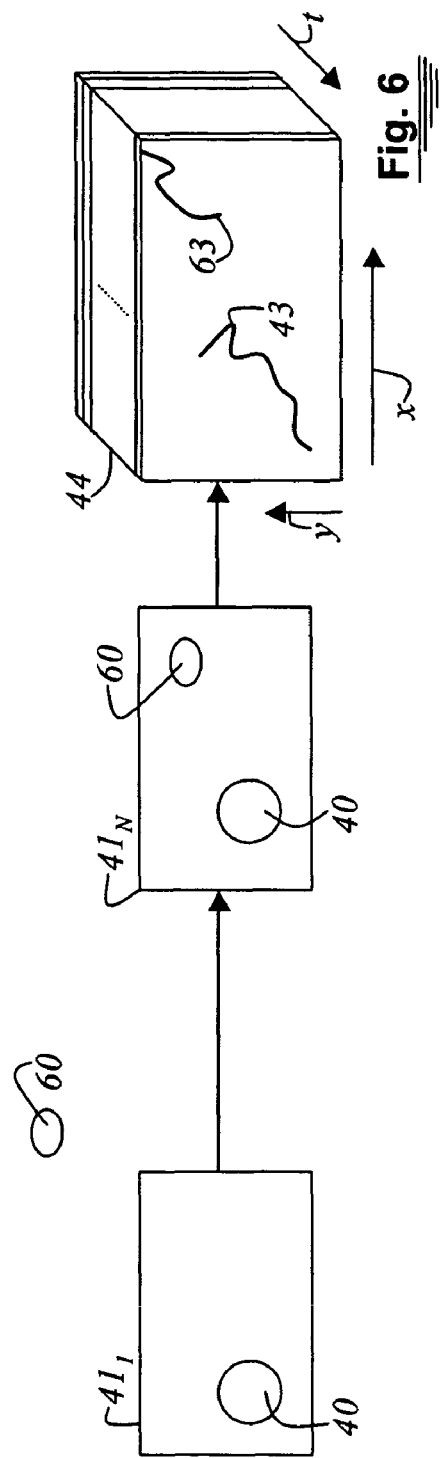
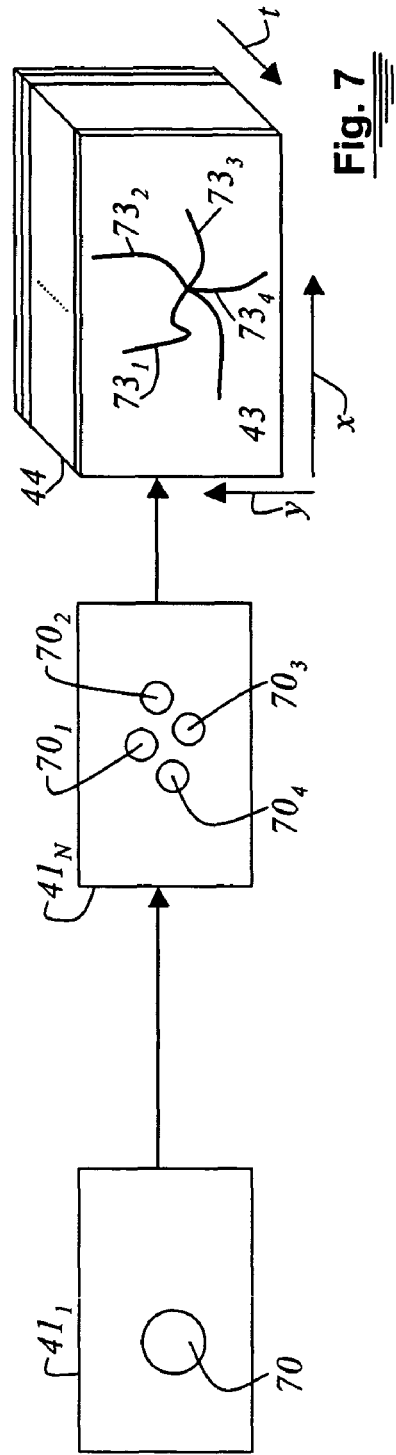

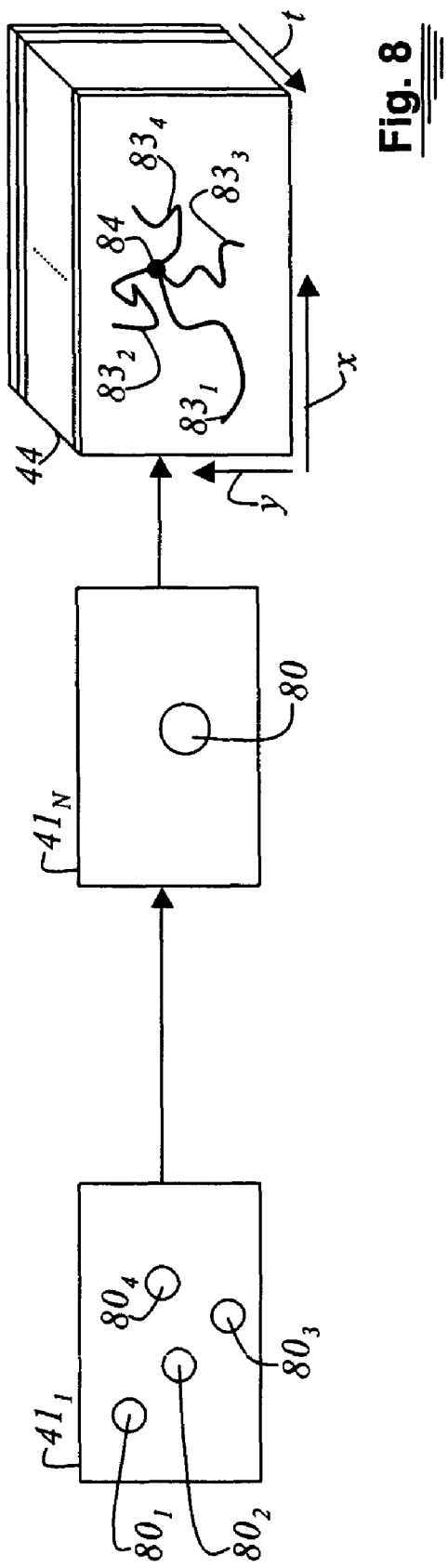

METHOD, ARRANGEMENT, AND SOFTWARE FOR OPTIMIZING THE IMAGE QUALITY OF MOVABLE SUBJECTS IMAGED WITH A MICROSCOPE

CROSS REFERENCE TO RELATED APPLICATIONS

This application claims priority of the German patent application 102 35 657.2 which is incorporated by reference herein.

FIELD OF THE INVENTION

The invention concerns a method for optimizing the image quality of image sequences of movable subjects acquired with a microscope.

The invention further concerns an arrangement for optimizing the image quality of image sequences of movable subjects acquired with a microscope.

BACKGROUND OF THE INVENTION

In the observation of living and movable subjects, artifacts occur in image production because the subjects move. This on the one hand results in unsharpness (motion generates artifacts similar to those of defocusing), and on the other hand, in confocal microscopy the images exhibit poor quality (signal-to-noise ratio) because methods such as image averaging cannot be applied to a pixel when motion is present. With averaging, for example, motion would cause subject pixels to be mixed with non-subject pixels.

SUMMARY OF THE INVENTION

It is the object of the invention to create a method with which it is possible to generate high-quality images of movable subjects, and to make possible efficient application of operations such as averaging and filtering, even to movable subjects.

The object is achieved by means of a method for optimizing the image quality of movable subjects imaged with a microscope system, comprising the following steps:
a) acquiring a plurality of images having a plurality of pixels;
b) determining a respective displacement vector field from a comparison of the pixels of each two chronologically successive images;
c) identifying a trajectory for each pixel of the image from the displacement vector fields; and
d) applying an operation to the image data along a trajectory.

A further object of the invention is to create an arrangement with which it is possible to generate high-quality images of movable subjects, and to make possible efficient application of operations such as averaging and filtering, even to movable subjects.

The object is achieved by way of an arrangement for optimizing the image quality of movable subjects imaged with a microscope system, the microscope system comprising: at least one objective defining an image window, a detector unit for acquiring a plurality of images each having a plurality of pixels, a computer system, which encompasses a means for determining a respective displacement vector field from a comparison of the respective pixels of at least two chronologically successive images, a means for identifying a trajectory for each pixel of the image from the displacement vector fields, and a means for applying an operation to the image data along a trajectory.

In order to solve the problem associated with these objects, it is advantageous that a trajectory, which records displacements and thus subject motions, is determined for each pixel of the image. The displacements and subject motions are advantageously determined as displacement vector fields which evaluate in their totality all of the motions within the scene. The displacement vector field results from a comparison of the pixels of, in each case, at least two chronologically successive images. The use of more than two images of a sequence may result in better convergence. Such displacement fields are determined by solving a flow problem, a pixel change model being formulated as a differential equation and fitted numerically to the image data using a minimum description length (MDL) method. Probably the most prominent representative of such models is the modeling of the motion of solid bodies in video technology, for which the synonym "optical flow method" has already become established. Further representatives may be found, for example, in climate modeling, where liquid bodies (from clouds to water) are modeled. Although the "optical flow" designation is not common here, this text uses the term synonymously. A trajectory is constructed by tracking the local displacement vectors from pixel to pixel, which can easily be accomplished with a computer algorithm. The trajectory determined in this fashion is a so-called guideline for the application of operations. Operations along the trajectory that is determined can be, for example (with no limitation as to generality), a deconvolution, a smoothing, or an averaging filter. An extension to the entire class of image processing classes operating in time-lateral fashion is included in this application in this context, and is left to the imagination of one skilled in the art in terms of implementing a system.

A peculiarity of these new operations is that ambiguities occur as a result of the motion and the displacement vector field. For example, a subject can migrate into the image segment, and a filter with memory must treat that new pixel differently from another, more-static pixel in the same scene. Another example is the splitting of a subject into several subjects (trajectory source). Yet another is the combination of individual pixels into one (trajectory sink). This is solved by way of intelligent trajectory management.

Further advantageous embodiments of the invention are evident from the dependent claims.

BRIEF DESCRIPTION OF THE DRAWINGS

The subject matter of the invention is depicted schematically in the drawings and will be explained below with reference to the Figures, in which:

FIG. 6 depicts an example of a situation in which a subject comes into the image;

FIG. 7 depicts a situation in which a subject splits and several trajectories result therefrom; and FIG. 8 depicts a situation in which several subjects combine into one subject, and the trajectories of the individual subjects end at one point.

DETAILED DESCRIPTION OF THE INVENTION

Figure 1:
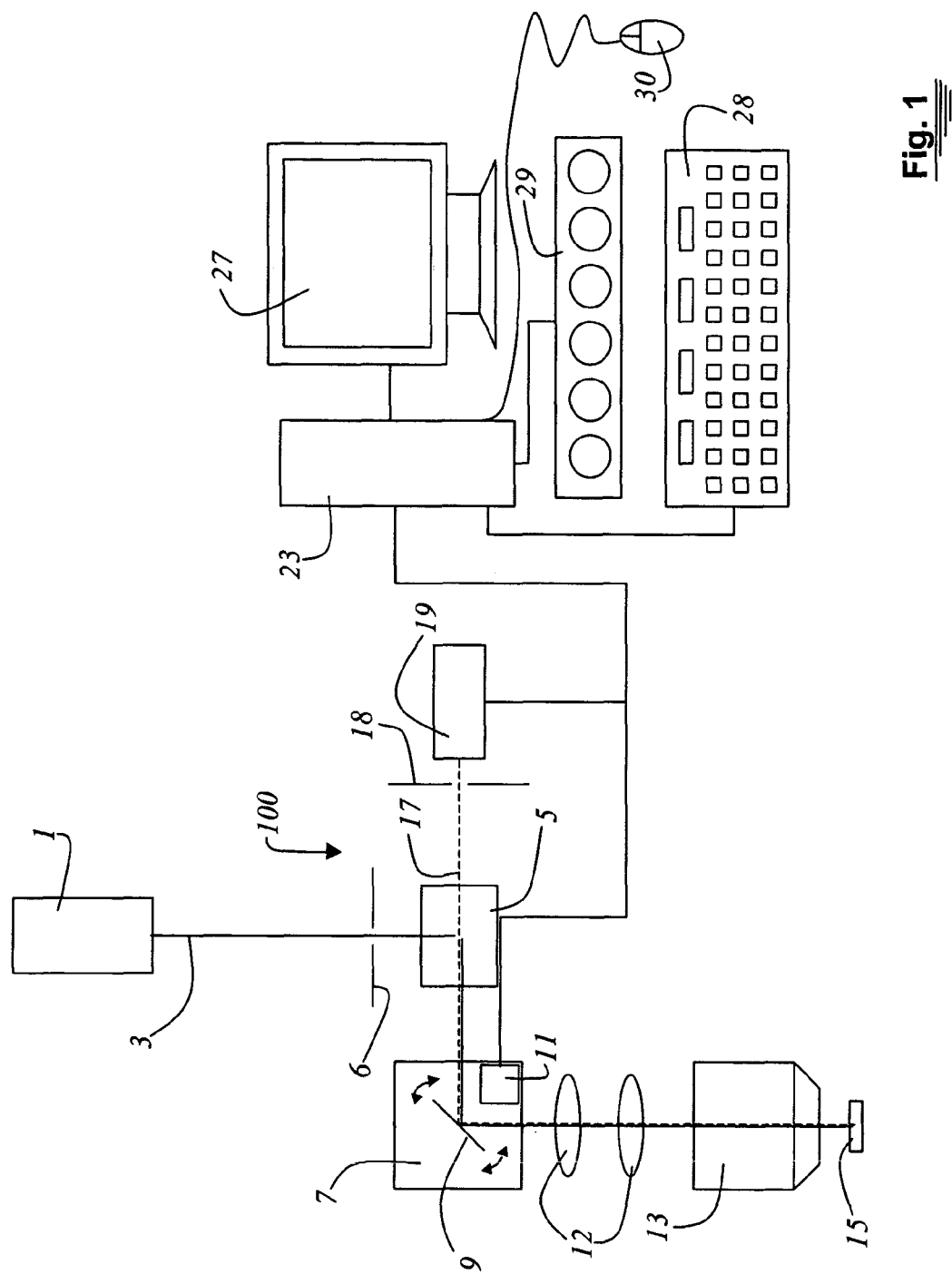
FIG. 1 schematically depicts a scanning microscope.

FIG. 1 schematically shows an exemplary embodiment of a confocal scanning microscope system with which the method according to the present invention can be carried out. Other microscope systems can likewise be used. A detector unit 19 is equipped with a video system or a CCD sensor for acquiring images.

This is not, however to be construed as a limitation of the invention. It is sufficiently clear to one skilled in the art that the invention can also be carried out with conventional microscopes with digital image production. Illuminating light beam 3 coming from at least one illumination system 1 is directed by a beam splitter or a suitable deflection means 5 to a scanning module 7. Before illuminating light beam 3 strikes deflection means 5, it passes through an illumination pinhole 6. Scanning module 7 comprises a gimbal-mounted scanning mirror 9 that guides illuminating light beam 3 through a scanning optical system 12 and a microscope objective 13, over or through a subject 15. In the case of nontransparent subjects 15, illuminating light beam 3 is guided over the subject surface. With biological subjects 15 (preparations) or transparent subjects, illuminating light beam 3 can also be guided through subject 15. For that purpose, non-luminous preparations are optionally prepared with a suitable dye (not depicted, since established existing art). The dyes present in the subject are excited by illuminating light beam 3 and emit light in a characteristic spectral region peculiar to them. This light proceeding from subject 15 defines a detected light beam 17. The latter travels through microscope optical system 13 and scanning optical system 12 and via scanning module 7 to deflection means 5, passes through the latter and arrives, through a detection pinhole 18, at least one detector unit 19, which is equipped in the exemplary embodiment depicted here with at least one photomultiplier as detector. It is clear to one skilled in the art that other detectors, for example diodes, diode arrays, photomultiplier arrays, CCD chips, or CMOS image sensors, can also be used. Detected light beam 17 proceeding from or defined by subject 15 is depicted in FIG. 1 as a dashed line. In detector 19, electrical detected signals proportional to the power level of the light proceeding from subject 15 are generated. Since, as already mentioned above, light of more than one wavelength is emitted from subject 15, it is useful to insert in front of detector unit 19 a selection means for the spectrum proceeding from the sample. The data generated by detector unit 19 are forwarded to a computer system 23. At least one peripheral unit 27 is associated with computer system 23. The peripheral unit can be, for example, a display on which the user receives instructions for adjusting the scanning microscope and can also view the present setup and also the image data in graphical form. Also associated with computer system 23 is an input means comprising, for example, a keyboard 28, an adjusting apparatus 29 for the components of the microscope system, and a mouse 30.

Figure 2:
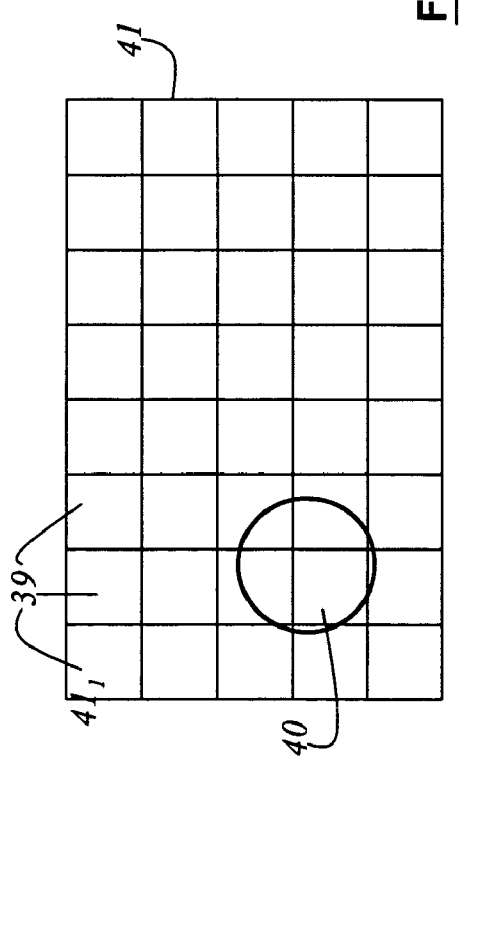
FIG. 2 schematically depicts the image frame imaged through the microscope, and the manner in which it is subdivided into individual regions or pixels.

FIG. 2 schematically depicts an image frame 41 acquired with microscope 100. Image frame 41 is defined by the image window determined by microscope 100. Image frame 41 is subdivided into individual regions or pixels 39. Movable subject 40 is located within image frame 41. Pixels 39 can be embodied as two-dimensional regions of image frame 41, or also as three-dimensional regions of image frame 41.

Figure 3:
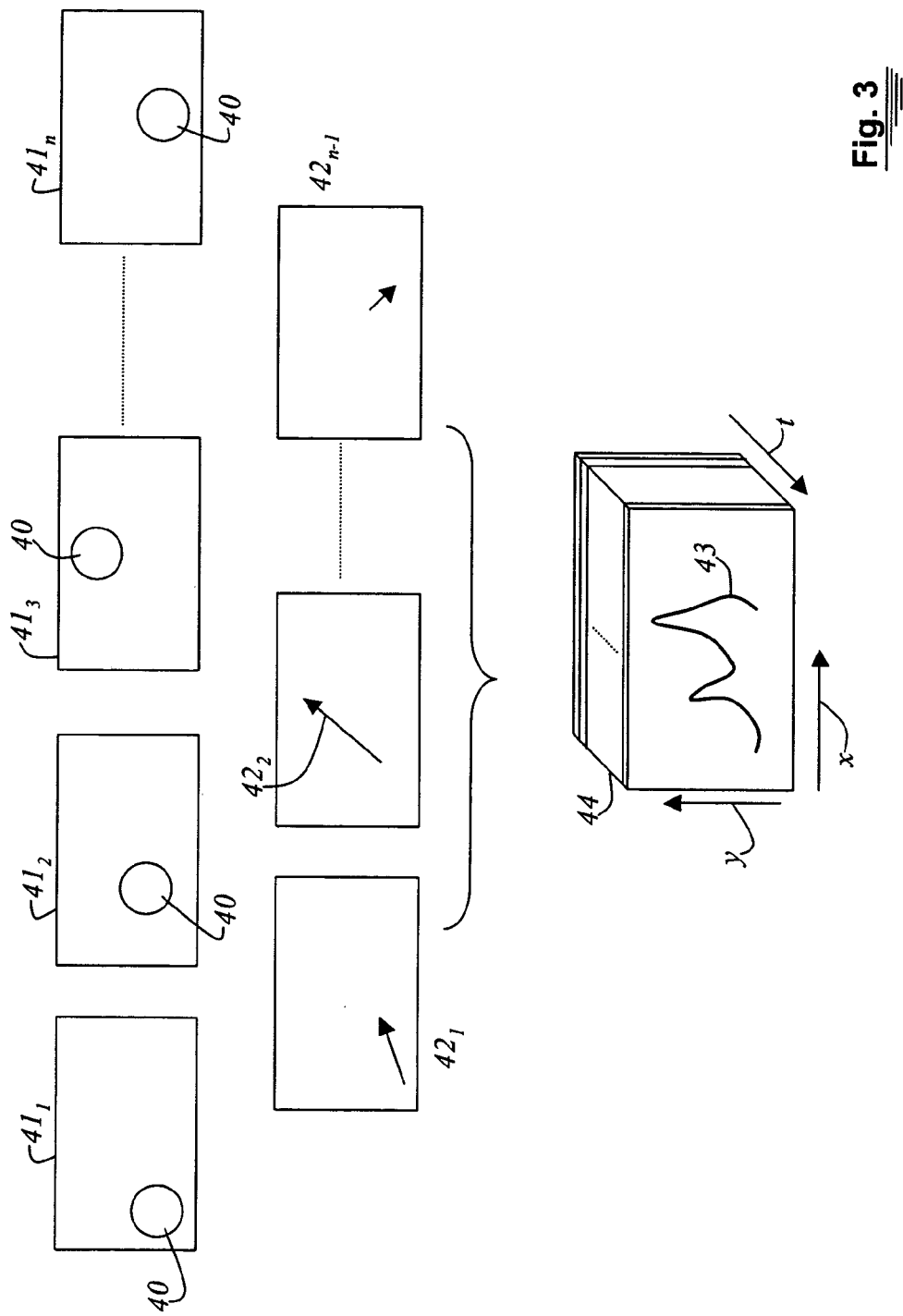
FIG. 3 schematically depicts the processing of the data obtained from the observation of living and movable subjects.

FIG. 3 shows the observation of living and movable subjects 40 and the processing of data obtained from the observation of living and movable subjects 40. For the observation of living and movable subjects 40, several images or image frames $41_1, 41_2, 41_3, \ldots, 41_n$ are acquired consecutively, for example using scanning microscope 100 described in FIG. 1, each image frame $41_1, 41_2, 41_3, \ldots, 41_n$ defining an XY plane or an acquired specimen volume XYZ. Between each two successive images, e.g. $41_1, 41_2$ or $41_2, 41_3$, or $41_{n-1}, 41_n$, a respective displacement vector field $42_1, 42_2, \ldots, 42_{n-1}$ is determined. The displacement vector field between two successive images, e.g. $41_2$ and $41_3$, can be determined from a comparison of the individual mutually corresponding pixels of the two images. Proceeding from a first image $41_1$ having N pixels, it is thus possible to ascertain the new positions in the next image $41_2$ by way of the displacement. An even more accurate model can also be fitted for a trajectory 43, with sub-pixel accuracy, from the discrete displacements. Advantageously, more than one successive image is then used for this accuracy-enhancing operation. Trajectory 43 for the movable subject is obtained from the plurality of displacement vector fields $42_1, 42_2, \ldots, 42_{n-1}$ by tracking the displacement vector fields of the individual images $41_1, 41_2, 41_3, \ldots, 41_n$. In the graphical depiction of trajectory 43, the moving subjects are represented by at least one trajectory through XYt space 44.

A video contains a three-dimensional space-time (two spatial dimensions XY, one time dimension t). The pixels of a movable subject 40 thus move along a curved path (trajectory) within this space-time. Trajectory 43 that is determined defines this curved path unequivocally, and data concerning the motion of subject 40 are thereby obtained. Operations that are to be applied to the moving subject can thus be performed along trajectory 43. For example, data about said trajectory 43 can be fed to an averaging filter, yielding an image of higher quality that takes into account the motion of subject 40, specifically in that the signal-to-noise ratio is better. This approach is of course also possible for sequences of volumes (four-dimensional space-time), and can be transferred to any kind of operation, e.g. filters (deconvolution, smoothing). In order to produce these filters, instead of the simple summing formulas common in image processing, the continuous operation equation must be discretized to the trajectory in the curved space-time, incorporating the present geometry. Such methods are established in numerical mathematics, and are existing art in simulation technology.

Figure 4:
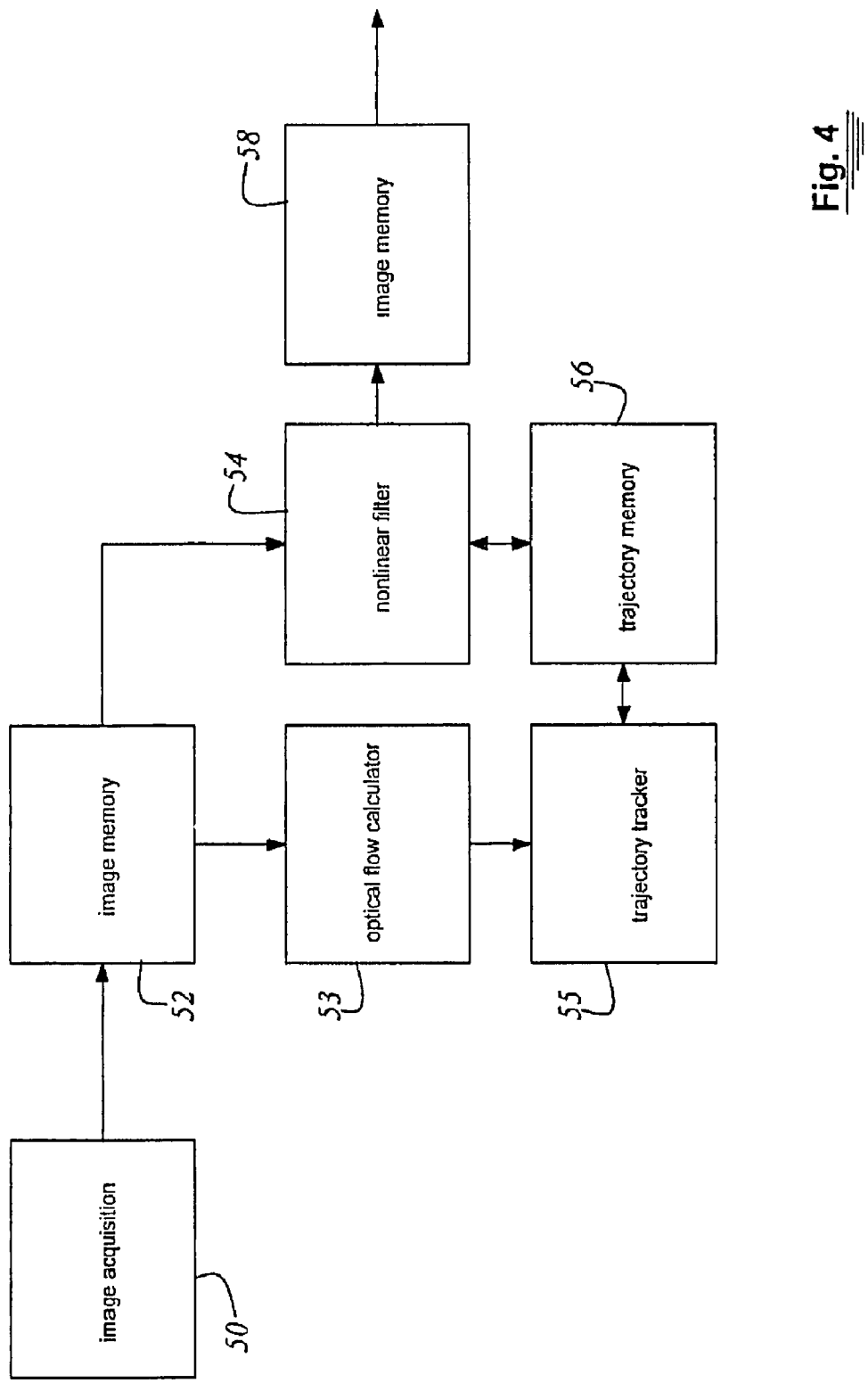
FIG. 4 is a block diagram of the method according to the present invention.

FIG. 4 is a block diagram of the method according to the present invention. The first step is image acquisition 50 of a series of images. As already described above, acquisition is accomplished using detector unit 19 of the microscope or scanning microscope. The data representing each image are stored in a first image memory 52. From image memory 52, the images are sequentially conveyed to an optical flow calculator 53. Parallel therewith, the data of each image are conveyed to a nonlinear filter 54. From optical flow calculator 53, the data modified by calculator 53 are conveyed to a trajectory tracker 55 and then to a trajectory memory 56. The data present in trajectory memory 56 are also made available to nonlinear filter 54 in order to allow discretization. As already mentioned above, any desired operations are applied to the acquired image data, taking place in nonlinear filter 54 in consideration of the stored trajectory 43. The data modified in this fashion travel into a second image memory 58 and can be retrieved from there, for example, for presentation on a display. Thus, a first image memory is provided, which stores the data of the plurality of acquired images; and a second image memory is provided, which stores the data created by the correlation of the data from the first image memory with the data from a trajectory memory.

Figure 5:
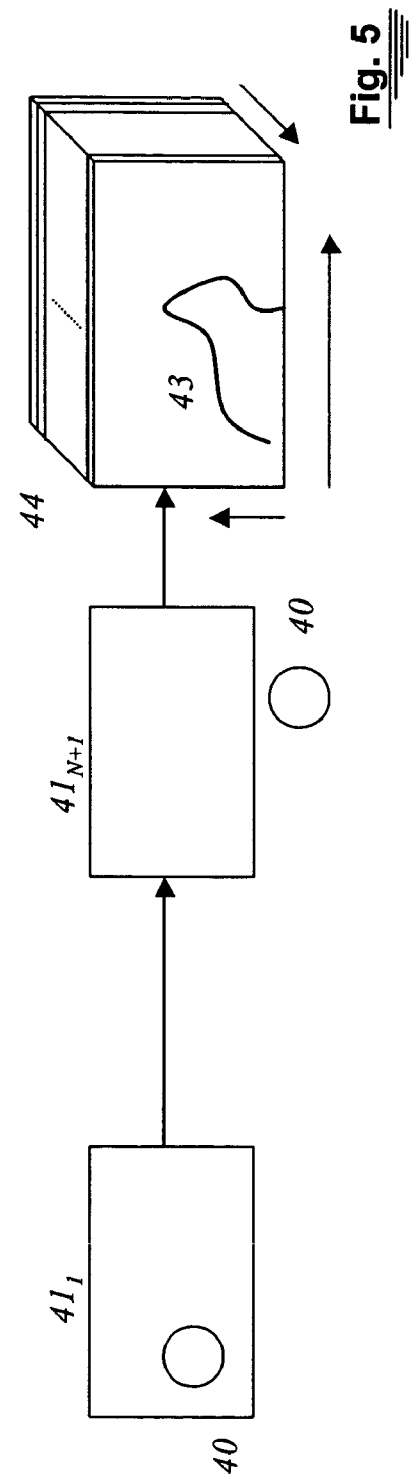
FIG. 5 depicts an example of a situation in which a subject leaves the image, and the identified trajectory ends at the edge.

FIGS. 5 through 8 depict various events that result in respectively distinguished trajectories. FIG. 5 depicts the situation in which subject 40 leaves image frame 41 during the recording of N image frames. Upon recording of the (N+1)th image frame, the subject can no longer be captured by the microscope. Trajectory 43 resulting from the N captured image frames ends at the edge of XYt space 44. It can be deleted from trajectory memory 56 by trajectory tracker 55.

FIG. 6 depicts the situation in which a subject 40 is present in first image frame $41_1$. During the recording of N image frames, a further subject 60 enters the region of the image frame, so that it can be captured by the microscope. Subject 60 can also be captured by the microscope when the Nth image frame is recorded. In addition to trajectory 43 for subject 40, a further trajectory 63 is added in XYt space 44 for subject 60 that has just entered the image frame of the microscope.

FIG. 7 depicts the situation in which a subject 70 is present in first image frame $41_1$. By the time the Nth image frame is recorded, subject 70 has split into, for example, four subjects $70_1, 70_2, 70_3$, and $70_4$. Subjects $70_1, 70_2, 70_3$, and $70_4$ can also be captured by the microscope upon recording of the Nth image frame. In addition to trajectory 43 for subject 70, four further trajectories $73_1, 73_2, 73_3$, and $73_4$ are added at an end point of trajectory 43 at a certain time t, representing the motions of four subjects $70_1, 70_2, 70_3$, and $70_4$.

FIG. 8 depicts the situation in which four subjects $80_1, 80_2, 80_3$, and $80_4$ are present in first image frame $41_1$. Upon recording of the Nth image frame, subjects $80_1, 80_2, 80_3$, and $80_4$ have combined into one subject 80. Trajectories $83_1, 83_2, 83_3$, and $83_4$ end in XYt space 44 at a point 84.

A computer-readable medium with software that causes a microscope system to carry out the inventive method is also contemplated by the present invention.

The invention has been described with reference to a particular exemplary embodiment. It is self-evident, however, that changes and modifications can be made without thereby leaving the range of protection of the claims below.

What is claimed is:

1. A method for optimizing image quality in a microscope system, comprising the following steps:
   optically acquiring images of a subject under a microscope by a detector unit, each image having a plurality of pixels;
   storing the images optically acquired by the detector unit in a first image memory;
   for each two chronologically successively acquired images comparing two chronologically successively acquired values detected for each pixel of the detector unit to determine a respective displacement vector field between the two chronologically successively acquired images;
   identifying a trajectory for each pixel of the acquired images from respective displacement vector fields determined for each two chronologically successively acquired images;
   storing trajectory data obtained from the images optically acquired by the detector unit in a trajectory memory;
   applying an operation to the images optically acquired by the detector unit along the identified trajectory; and
   storing the images created by filtering of the images from the first image memory with the trajectory data from the trajectory memory in a second image memory.

2. The method as defined in claim 1, wherein the operation along the identified trajectory is a deconvolution, a smoothing, an averaging filter, or an operation acting in time-lateral fashion.

3. The method as defined in claim 1, wherein data obtained from the images optically acquired by the detector unit is conveyed to an optical flow calculator and to a trajectory tracker to obtain the trajectory data.

4. The method as defined in claim 3, wherein for the application of the operation, the images optically acquired by the detector unit are retrieved from the first image memory and corresponding trajectory data is retrieved from the trajectory memory in a correlated way.

5. The method as defined in claim 4, wherein the data generated by application of the operation is conveyed to the second image memory.

6. The method as defined in claim 1, wherein the microscope system contains a scanning microscope or a conventional microscope.

7. An arrangement for optimizing image quality in a microscope system, comprising:
   at least one objective defining an image window, a detector unit for optically acquiring images of a subject under a microscope, each image optically acquired by the detector unit having a plurality of pixels, and
   a computer system comprising:
      a means for determining a respective displacement vector field from a comparison of each two chronologically successively acquired images comparing two chronologically successively acquired values detected for each pixel of the detector unit,
      a means for identifying a trajectory for each pixel of the images optically acquired by the detector unit from respective displacement vector fields determined for each two chronologically successively acquired images,
      a means for applying an operation to the images optically acquired by the detector unit along the identified trajectory,
      a first image memory storing the images optically acquired by the detector unit,
      a trajectory memory storing trajectory data obtained from the images optically acquired by the detector unit, and
      a second image memory storing the images created by filtering of the images from the first image memory with the trajectory data from the trajectory memory.

8. The arrangement as defined in claim 7, wherein the means for applying an operation to the images optically acquired by the detector unit along the identified trajectory is chosen from: a deconvolution means, a smoothing means, an averaging filter, or a means for operation acting in time-lateral fashion.

9. The arrangement as defined in claim 7, wherein the microscope system encompasses a scanning microscope or a conventional microscope.

10. A non-transitory computer-readable medium with software that causes a microscope system to carry out a method as defined in one of claims 1 through 6.

* * * * *